United States Patent [19]

Kurahashi

[11] 3,969,095
[45] July 13, 1976

[54] AIR FILTER APPARATUS

[76] Inventor: Shigeru Kurahashi, 28, 5-chome, Nishisuminoe-cho, Sumiyoshi, Osaka, Japan

[22] Filed: Aug. 23, 1974

[21] Appl. No.: 499,917

[30] Foreign Application Priority Data

Aug. 25, 1973 Japan.......................... 48-99772[U]
May 22, 1974 Japan.......................... 49-59123[U]

[52] U.S. Cl.................................. 55/350; 55/387; 55/418; 55/479; 55/484; 55/517
[51] Int. Cl.²...................................... B01D 46/30
[58] Field of Search ............ 55/350, 484, 418, 419, 55/316, 387, 479, 483, 512, 517, 518, 387; 210/333; 23/288 F, 288 R

[56] References Cited
UNITED STATES PATENTS

| 2,016,033 | 10/1935 | Christofferson | 55/521 |
| 2,214,737 | 9/1940 | Dauphinee | 55/350 |
| 2,589,229 | 3/1952 | Dauphinee | 55/387 |
| 2,600,435 | 6/1952 | Shapiro | 55/387 |
| 2,686,572 | 8/1954 | Cameron et al. | 55/387 |
| 3,094,394 | 6/1963 | Innes et al. | 23/288 F |
| 3,166,382 | 1/1965 | Purse et al. | 55/517 |
| 3,319,401 | 5/1967 | Bogardus | 55/387 |
| 3,538,688 | 11/1970 | Stanley, Jr. et al. | 55/418 |
| 3,581,476 | 6/1971 | Rivers | 55/387 |

FOREIGN PATENTS OR APPLICATIONS 1,060,652   11/1953   France.................. 55/517

Primary Examiner—Bernard Nuzick
Attorney, Agent, or Firm—Stewart and Kolasch, Ltd.

[57] ABSTRACT

An air filter apparatus comprising an inner sleeve having a number of small apertures, an externally tapered outer sleeve having a number of small apertures, said inner sleeve being inserted in said outer sleeve and fixed in position to form a double-wall cylinder, a funnel-shaped suction port disposed at the mouth edge of the inner sleeve on the side where the larger diameter of the outer sleeve exists and active carbon packed in a space between the inner and outer sleeves.

5 Claims, 6 Drawing Figures

AIR FILTER APPARATUS

BACKGROUND AND SUMMARY OF THE INVENTION

The present invention relates to an air filter apparatus adapted to be used by being affixed to air conditioners. Heretofore, air conditioners for cooling and heating purposes have been provided with an air filter in the air suction region for removal of contaminants in the air including dust, bad odors and microorganisms. However, such a conventional air filter has the disadvantage that complete removal of contaminants can not be attained without aggravation of the air passage conductance due to the air filter, thus causing windage loss in the air suction region. Also, increased air suction efficiency can not be attained without resulting in incomplete removal of contaminants. Other problems are that if it is desired to carry out complete removal of contaminants without any substantial decrease in air suction efficiency, this would require a large space so that the air filter apparatus would become large in size.

The present invention has been accomplished in view of these points.

An object of the present invention is to increase air suction efficiency while minimizing windage loss in the air suction region.

Another object of the present invention is to carry out efficient air purification by utilizing a narrow space.

A further object of the present invention is to provide individual units, each capable of developing its function independently of the others, wherein a plurality of such units can be combined together and unitized and thus be installed in air conditioners of various sizes.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
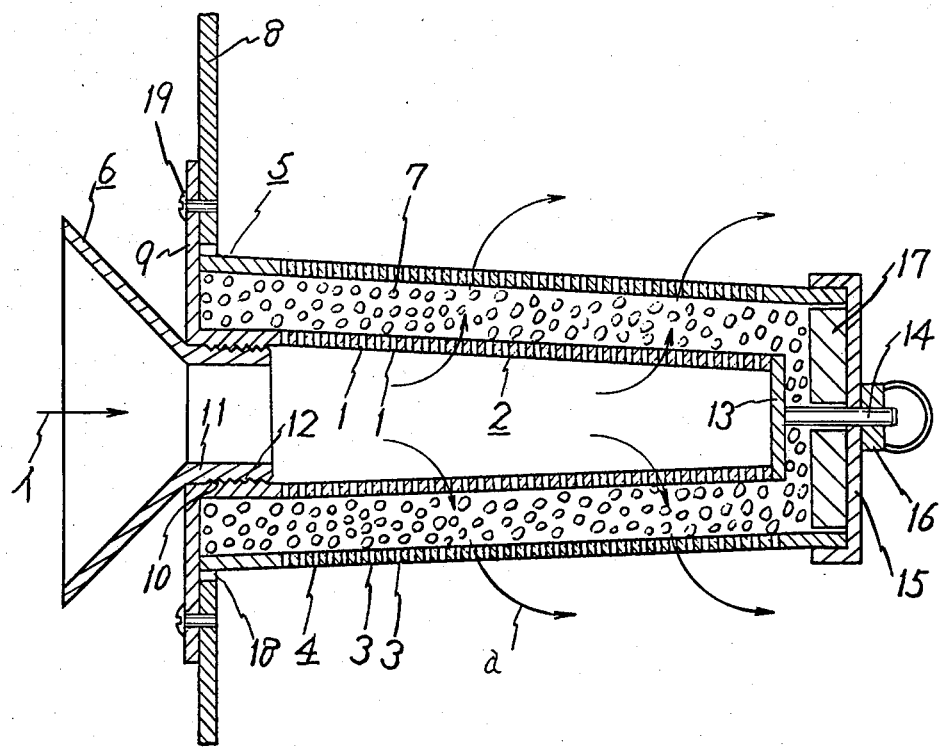
FIG. 1 is a sectional view of an embodiment of the present invention.

In FIG. 1, the element 2 designates an inner sleeve and element 4, an outer sleeve, both being made of punched board or the like and having a number of small apertures 1 and 3, respectively. The outer periphery being tapered. The inner sleeve 2 is inserted in the outer sleeve 4 and fixed in position to form a double-wall cylinder 5. An attachment plate 9 is welded to the front end of the double-wall cylinder 5 in such a manner that the edge of a central opening in the attachment plate 9 substantially conforms to the mouth edge of the inner sleeve 2. The front end portion of the inner sleeve 2 is provided with internal threads 10, said internal thread portion 10 being in removable engaging relationship with the externally threaded portion 12 of the neck 11 of the funnel-shaped suction port 6. In this embodiment, the funnel-shaped suction port 6 has a larger caliber than the inner sleeve and an inlet opening angle of about 45°. The inner sleeve 2 has a rear plate 13 fixed to the rear end thereof, which, in turn, has a bolt 14 projecting therefrom. The front end of said bolt is inserted in a central opening in a cap 15 removably fitted over the rear end of the outer sleeve 4, with a nut 16 applied to said bolt to fix the cap 15 in position. With the cap 15 removed, active carbon 7 is packed in a space between the inner and outer sleeves 2 and 4, and before the cap is attached, an elastic body 17 such as a synthetic resin foam or spring material is inserted in the end of the filter element and presses against the active carbon 7, thereby preventing the movement of the active carbon 7 due to vibrations during transport and use of the apparatus.

Figure 2:
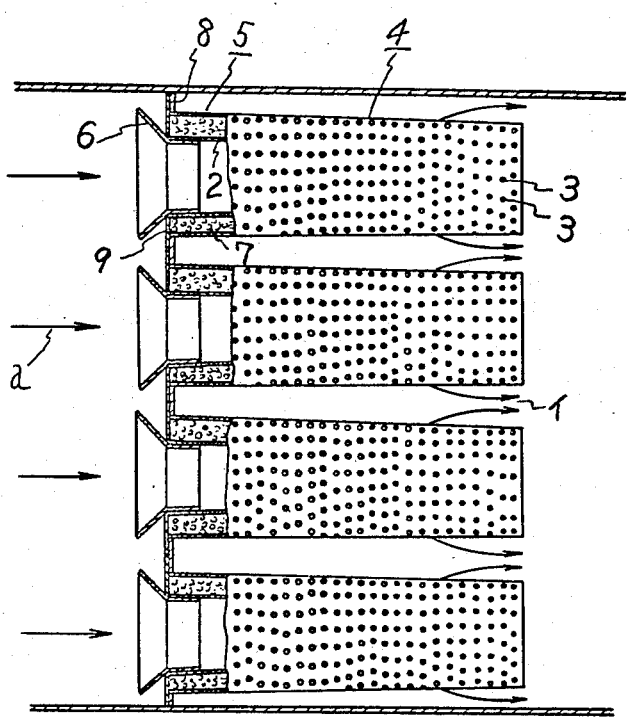
FIG. 2 is a sectional view of an embodiment wherein air filters such as shown in FIG. 1 are unitized.
Figure 3:
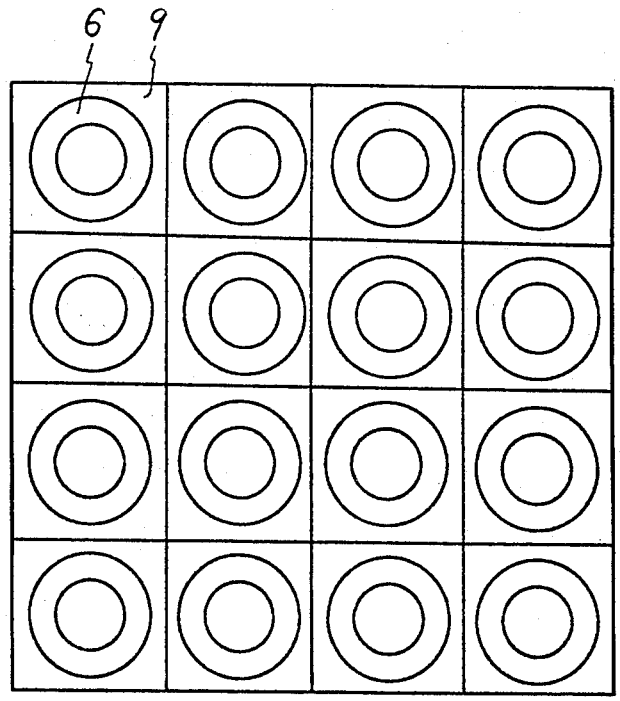
FIG. 3 is a front view of FIG. 2.

FIGS. 2 and 3 show the manner in which a plurality of air filters constructed in the manner described above are arranged on a base plate 8. In FIGS. 1, 2 and 3, the base plate is positioned at right angles to the direction of movement of air and has openings 18, in which the double-wall cylinders 5 are vertically inserted. Attachment plates 9 are removably attached to the base plate as by set screws 19. Thus, when the air to be filtered arrives at the funnel-shaped suction ports 6, it flows into the inside of the inner sleeves 2 through the suction ports 6 as shown by arrows a, passes through the small apertures, and passes through the layers of active carbon 7, where it is purified, whereupon it flows out through the small apertures 3 in the outer sleeves 4. In the process of the flow of air, the effective suction area of the air filter is greater than that provided by the diameter of the inner sleeve 2 because of the funnel shape of the suction port 6, whose caliber is larger than the inner sleeve, so that the amount of flowing air is large for the size of the air filter. Further, since the outer sleeve 4 are externally tapered, even if the double-wall cylinders 5 are arranged adjacent each other as shown in FIGS. 2 and 3, this will not have any adverse influence on the amount of flowing air.

Figure 4:
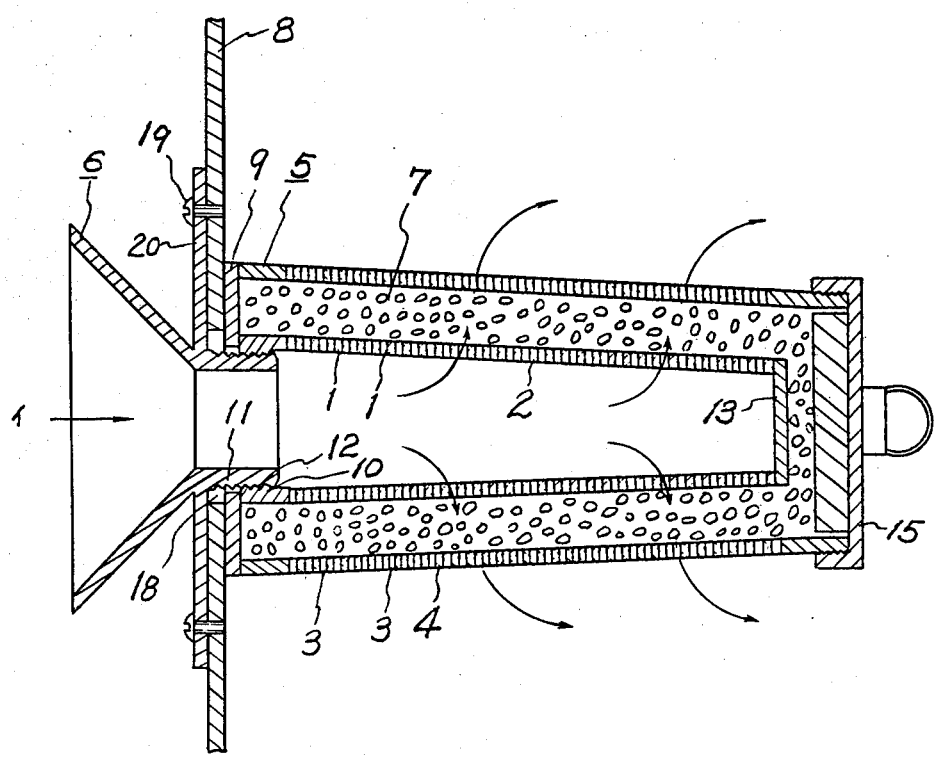
FIG. 4 is a sectional view of a further embodiment of the present invention.

In the embodiment shown in FIG. 1 the attachment plates 9 have been shown directly attached to the base plate 8. In an embodiment shown in FIG. 4, however, a funnel-shaped suction part 6 is integrally provided with a fixture plate 20. Thus, the neck 11 of the funnel-shaped suction port 6 is inserted in the opening in the base plate 8 and the fixture plate 20 is fixed to the base plate 8, whereupon the internally threaded portion 10 of the inner sleeve 2 of the double-wall cylinder 5 is fitted over the externally threaded portion 12 of the funnel-shaped suction port 6.

In addition, if the double-wall cylinder and suction port are made of a synthetic resin, this is advantageous in that they will not rust or corrode when exposed to moisture.

Figure 5:
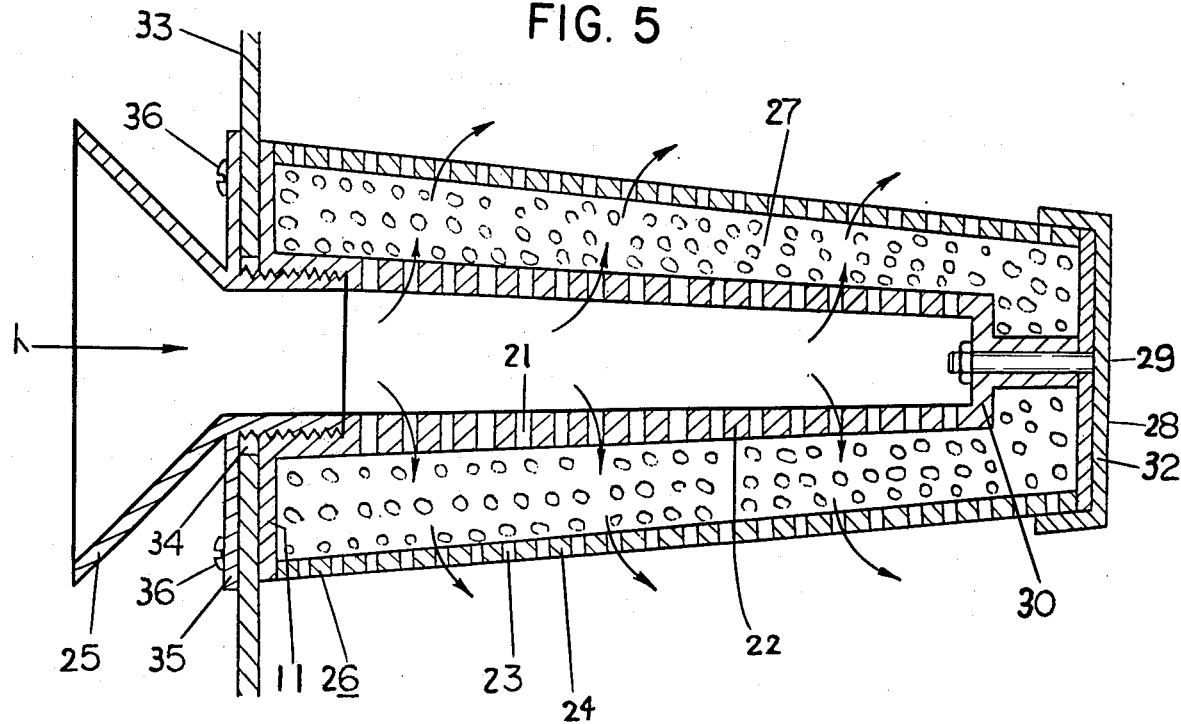
FIG. 5 is a sectional view of an additional embodiment of the present invention.
Figure 6:
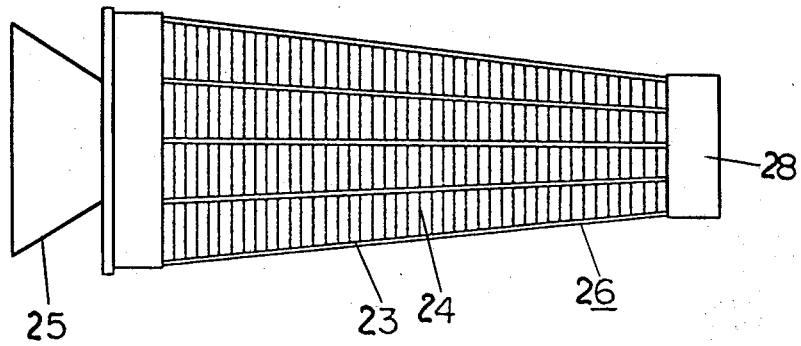
FIG. 6 is a reduced side view of the embodiment shown in FIG. 5.

FIGS. 5 and 6 show an additional embodiment of the invention, wherein the numerals 22 and 24 designate inner and outer sleeves, respectively, and they are made of a synthetic resin, metal or the like and have small apertures 21 and 23, respectively. The inner sleeve 22 is surrounded by the outer sleeve 24, thus forming a double-wall cylinder 26. One end of the double-wall cylinder has an attachment plate 31 fixed thereto in such a manner that only the end of the inner sleeve is left uncovered to provide an opening. The other end of the double-wall cylinder has a cap 28 removably attached thereto. In the embodiment shown, the cap 28 is fitted over the outer sleeve 24 and a bolt 29 extending from said cap is screwed into a rear plate 30 on the rear end of the inner sleeve 22. The element 25 designates a funnel-shaped suction port whose caliber is larger than the inner sleeve, having an opening angle of about 45 degrees and adapted to have its neck portion screwed into the openings in the inner sleeve 22. Thus, with the cap 28 removed, an adsorbent 27 is packed in the space between the inner and outer sleeves 22 and 24, and the cap 28 is then attached in place, whereby an elastic body 32 such as a synthetic resin foam secured to the cap presses against the adsorbent 27. The degree of opening per unit area of the small apertures 21, 23 bored in the inner and outer sleeves 22 and 24 is gradually increased from the rear toward the front of the double-wall cylinder 26. For example, in order to gradually increase the degree of opening of the small apertures 21 and 23 per unit area from the rear toward the front as described above, the area of the opening of the single apertures 21 and 23 may be changed or the number of apertures 21 and 23 per unit area may be changed. In this case, if the inner and outer sleeves 22 and 24 are tapered toward the rear, the degree of opening of the small apertures 21 and 23 per unit area becomes gradually larger from the rear toward the front. Further, the small apertures 21 and 23 are not limited to circular apertures, but they may be, for example, elongated openings. The air filter constructed in the manner described above is used by being attached to the base plate 33 of an air purifying apparatus. In this case, the base plate 33 is arranged at right angles to the direction of travel of the air and has an opening 34 bored therein, in which the neck of the suction port 25 is inserted, and fixture plate 35 integral with the suction port 25 is removably secured to the base plate 33 by set screws 36, whereupon the internal thread on the inner sleeve 22 of the double-wall cylinder 26 is engaged over the external thread on the neck of the suction port 25. Thus, when the air to be filtered arrives at the funnel-shaped suction port 25, it flows into the inside of the inner sleeve 22 through the suction port 25 and passes through he small apertures 21 in the inner sleeve 22 and then through the layer of adsorbent 27, where it is purified by the adsorbent 27, whereupon it flows out through the small apertures 23 in the outer sleeve 24. In this case, in the process of the flow of air, the effective suction area of the air filter apparatus is greater than that which would be provided by the diameter of the inner sleeve 22 because of the funnel shape of the suction port 25 whose caliber is larger than the inner sleeve, so that the rate of air flow is high for the size of the air filter apparatus. Incidentally, the air sucked through the funnel-shaped suction port tends to flow out in a larger amount from the rear than from the front. However, since the degree of opening of the small apertures 21 and 23 per unit area is gradually increased from the rear toward the front of the double-wall cylinder 26, the air flows out uniformly throughout the body of the double-wall cylinder.

The invention being thus described, it will be obvious that the same may be varied in many ways. Such variations are not to be regarded as a departure from the spirit and scope of the invention, and all such modifications are intended to be included within the scope of the following claims.

What is claimed is:
1. An apparatus for use in the filtration of air which comprises a frusto-conically shaped inner sleeve defining a central zone and containing a plurality of small apertures and a frusto-conically shaped outer sleeve containing a plurality of small apertures, the number of said small apertures per unit area being gradually increased from the rear end toward the front end of said inner and outer sleeves, said inner sleeve being coaxially disposed within and spaced apart from said outer sleeve and defining therebetween a space which is adapted to contain a filter material, said space being closed at the front end with an attachment plate member which connects the inner and outer sleeves, and the rear end of the inner sleeve being closed by a rear plate and the rear end of the outer sleeve being closed by a removable cover, said inner and outer frusto-conically shaped sleeves being cover, said inner and outer frusto-conically shaped sleeves being tapered from the front end thereof having the larger diameter to the rear end thereof having the smaller diameter, and a funnel-shaped suction port disposed at the inlet end of the central zone and associated with the inner sleeve.

2. The apparatus of claim 1, wherein an elastic member is disposed inside of said rear end between said cover and such filter material, thereby preventing movement of such filter material due to vibration.

3. The apparatus of claim 1, used in plurality and mounted in juxtaposition on a base plate.

4. The apparatus of claim 1, wherein the funnel-shaped suction port is provided with a neck portion which is in screw engagement with the inner sleeve, said funnel-shaped suction port being integrally provided with a fixture plate, said fixture plate being fixed to a base plate which is disposed at the front end of the apparatus.

5. The apparatus of claim 4, wherein the funnel-shaped suction port defines an inlet area substantially larger than the inlet area of the central zone defined by said inner sleeve.

* * * * *